US 6,640,923 B1

United States Patent
Dominke et al.

(10) Patent No.: US 6,640,923 B1
(45) Date of Patent: Nov. 4, 2003

(54) METHOD FOR STEERING A VEHICLE USING A POWER-ASSISTED STEERING SYSTEM

(75) Inventors: Peter Dominke, Bietigheim-Bissingen (DE); Chi-Thuan Cao, Korntal-Muenchingen (DE); Wolfgang Pfeiffer, Grossbottwar (DE); Klaus-Dieter Leimbach, Eschach (DE); Werner Harter, Illingen (DE); Peter Blessing, Heilbronn (DE); Herbert Lohner, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,518
(22) PCT Filed: Jul. 3, 2001
(86) PCT No.: PCT/DE01/02396
§ 371 (c)(1), (2), (4) Date: Jul. 22, 2002
(87) PCT Pub. No.: WO02/02389
PCT Pub. Date: Jan. 10, 2002

(30) Foreign Application Priority Data

Jul. 4, 2000 (DE) .......................................... 100 32 340

(51) Int. Cl.$^7$ ................................................ B62D 5/04
(52) U.S. Cl. ...................... 180/446; 180/443; 701/41; 701/42
(58) Field of Search ................................ 180/446, 444, 180/443, 421; 701/41, 42

(56) References Cited

U.S. PATENT DOCUMENTS

| 5,236,335 | A | * | 8/1993 | Takeuchi et al. | ........... 180/79.1 |
| 6,052,633 | A | * | 4/2000 | Fukuyama et al. | ........... 701/41 |
| 6,170,600 | B1 | * | 1/2001 | Shimizu | ...................... 180/446 |
| 6,182,003 | B1 | * | 1/2001 | Maier-Landgrebe | ......... 701/84 |
| 6,446,749 | B2 | * | 9/2002 | Hackl et al. | ................. 180/446 |

FOREIGN PATENT DOCUMENTS

| DE | 37 34 477 | 4/1988 |
| JP | 10 226350 | 8/1998 |

OTHER PUBLICATIONS

Patent Abstracts of Japan, vol. 1998, No. 13, Nov. 30, 1998*.

* cited by examiner

Primary Examiner—Lesley D. Morris
Assistant Examiner—Tony Winner
(74) Attorney, Agent, or Firm—Kenyon & Kenyon

(57) ABSTRACT

A method for steering a vehicle and a steering system are provided, in which a variable torque support of the driver's steering wish and intervention in the position of the steered wheels triggered by a driving dynamics regulator are implementable without mutually interfering with one another. In addition, further additional functions, such as the lane guidance system of the vehicle, may be integrated into a steering system easily and either with or without compensation of the steering feel at the steering wheel.

14 Claims, 7 Drawing Sheets

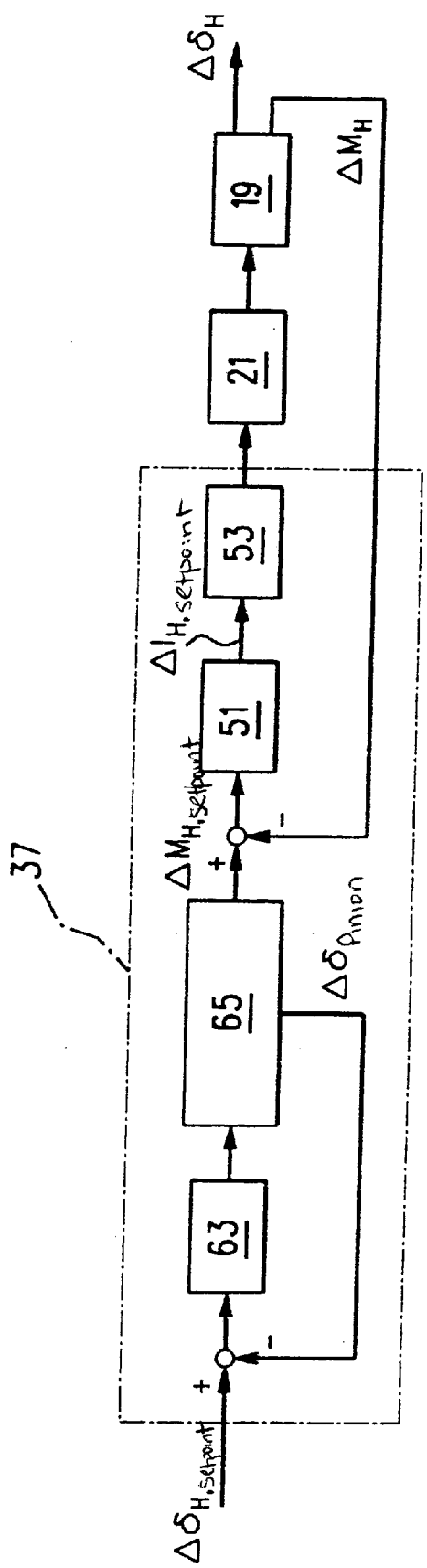
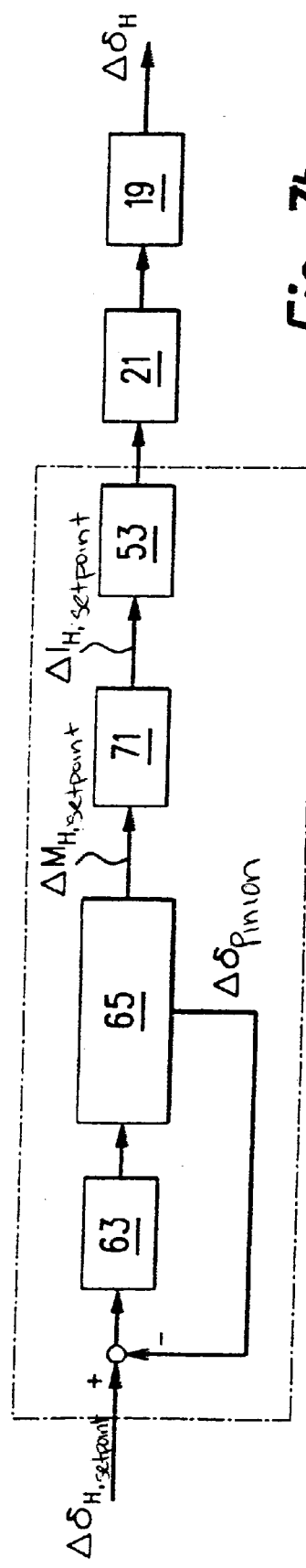

METHOD FOR STEERING A VEHICLE USING A POWER-ASSISTED STEERING SYSTEM

FIELD OF THE INVENTION

The present invention relates to a method for steering a vehicle and a steering system for a vehicle.

BACKGROUND INFORMATION

In power-assisted steering systems, a torque-supporting hydraulic or electric steering actuator may reduce the torque to be applied for steering the vehicle and thus may relieve the driver. In addition, in power-assisted steering systems, it is believed that the torque support and/or the transmission ratio of the steering system are speed dependent. At lower speeds, such as those typical for parking and unparking, very direct steering having high torque support may be used, while during more rapid travel, indirect steering having low torque support may be desirable.

In order to further increase the driving stability of vehicles, steering systems may include a driving dynamics regulator that adjusts the setting of the steered wheels independently from the steering wish of the driver. In this case, the driving dynamics regulator superimposes an additional steering angle on the steering wish of the driver at the steering column.

In these steering systems, torque support and driving dynamics regulation mutually influence one another, which may result in the following disadvantages:

Due to the low torque support and indirect steering at high driving speeds, interventions in positioning the steered wheels which are performed by a superposition gearbox on the steering wheel motor acting on the steering column may not be performed with the necessary speed.

The torque support and the steering feel, which is transmitted to the driver by the steering wheel, may not be capable of being influenced and adjusted independently of one another.

It may be at least difficult to integrate further functions into the steering system.

SUMMARY OF THE INVENTION

An object of an exemplary embodiment according to the present invention is to provide a method for steering a vehicle, in which the torque support and driving dynamics regulation do not negatively influence one another. In addition, an exemplary method according to the present invention may be easily adapted to various vehicle types and may ease the integration of further functions.

This object is achieved by an exemplary method according to the present invention, in which the steering wheel angle is detected, the steering wheel angle is modified as a function of the driving speed, a correction steering angle is determined as a function of the driving dynamics of the steered vehicle, the modified steering wheel angle and the correction steering angle are superimposed to form a setpoint steering angle, the position of the steered wheels is detected, the angle difference between the setpoint steering angle and the position of the steered wheels is formed, the position of the steered wheels is regulated as a function of the angle difference ($\delta_{Pinion,setpoint} - \delta_{Pinion}$), and the correction steering wheel angle is compensated for at the steering column.

In an exemplary method according to the present invention, the driving dynamics intervention is not performed by activating the steering wheel motor acting on the steering column, but rather by activating a steering motor acting on the steered wheels. In this manner, the driving dynamics intervention is independent of the torque support of the steering actuator and, in addition, the steering column is relieved from transmitting the torque caused by the driving dynamics intervention.

The steering wheel motor of a steering system operating according to an exemplary method according to the present invention is used for compensating the change in the position of the steered wheels caused by the driving dynamics intervention, so that the steering feel may be influenced independently of the torque support. Therefore, a steering system operating according to the exemplary method according to the present invention may be more easily adaptable and easier to control. In addition, the reliability of the steering system may be increased, since the steering column is relieved in relation to typical power assisted steering systems having a driving dynamics regulation system. This compensation is not restricted to the change in the steering feel, which is caused by the driving dynamics intervention, but may also be used for a change in the steering feel for other reasons.

The position of the steered wheels may be regulated by a first position regulator having PD characteristic or a cascade structure, the output signal of the first position regulator is a setpoint torque to be transmitted from the steering motor to the pinion, the setpoint torque is converted into a setpoint current, and the steering motor is driven with the setpoint current, so that high-quality regulation is ensured.

In addition, further functions may be integrated into an exemplary method according to the present invention without a large outlay. At the same time, a steering system operating according to an exemplary method according to the present invention may remain easily adaptable.

In another exemplary method according to the present invention, the first position regulator has a nonlinear static characteristic or an adaptive variable characteristic, so that the regulation behavior may be further improved.

In a further exemplary method according to the present invention, the modified steering wheel angle ($\delta_{H+}$) is converted into a setpoint yaw rate ($\omega_{ref}$) or a setpoint transverse acceleration ($a_y$), and a correction steering wheel angle ($\Delta\delta_{H,Setpoint}$) is regulated as a function of the setpoint yaw rate ($\omega_{ref}$) or the setpoint transverse acceleration ($a_y$), so that the driving stability of the vehicle is further increased by influencing the position of the steered wheels. The output signal of the yaw regulator is a correction steering wheel angle ($\Delta\delta_{H,Setpoint}$), which may be superimposed on the reference variable of the first position regulator and in addition may be used as a reference variable at the steering column for compensating the steering movement.

In yet another exemplary method according to the present invention, the yaw regulator is a PD regulator or a model-following regulator, so that stable regulation behavior of high regulating quality may be achieved.

In still another exemplary method according to the present invention, the correction steering wheel angle is converted into a correction torque, the differential torque existing between the two parts of the steering column is measured, the torque difference is formed from the correction torque and the differential torque, and the correction steering wheel angle is compensated for as a function of the torque differential. Through the regulation of the hand torque, the change in the steering feel, which results from an intervention of the driving dynamics regulator in the position of the steered wheels, may be completely compensated for, so that the driver of the vehicle does not feel this intervention.

In yet another exemplary method according to the present invention, the correction steering wheel angle is converted into a correction torque, the correction torque is converted into a setpoint correction current, and the correction steering wheel angle is compensated for at the steering wheel as a function of the setpoint correction current, so that a torque sensor on the steering column may not be required.

In still another exemplary method according to the present invention the rotational angle difference between both parts of the steering column is measured, the angle difference is formed from the correction steering wheel angle and the rotational angle difference, and the correction steering wheel angle is compensated for at the steering wheel as a function of the angle difference, so that an angle sensor may be used on the steering column instead of a torque sensor.

In yet another exemplary method according to the present invention, a lane guidance steering wheel angle change is determined, and a setpoint torque difference is superimposed on the setpoint steering torque as a function of the lane guidance steering wheel angle change and the modified steering wheel angle, so that, without intervening in the structure of the exemplary method according to the present invention, a lane guidance regulation system may be integrated into the exemplary method. In the same way, further functions may be integrated into an exemplary method according to the present invention.

In still another exemplary method according to the present invention, a lane guidance steering wheel angle change is determined, the angle difference is formed from the modified steering wheel angle and the lane guidance steering wheel angle change, a lane guidance steering wheel angle difference is superimposed on the modified steering wheel angle as a function of the angle difference, and the setpoint steering angle is regulated as a function of the setpoint steering wheel angle resulting therefrom, so that the driver feels the intervention by the lane guidance regulator through the change in the torque transmitted to his hands by the steering wheel.

In variants of the integration of the lane guidance regulation system, the driver detects the intervention by the steering feel and he may decide whether he will accept this preset course or not. However, the driver still has the responsibility for the driving direction of the vehicle as before; he may also ignore the course preset by the lane guidance regulator.

The object described above may also be achieved by a steering system for a motor vehicle having a steering wheel mounted on a steering column, having a rotational angle or torque sensor mounted on the steering column, having a steering gearbox, having a hydraulic or electrical steering actuator, having a second rotational angle sensor to measure the position of the steered wheels, and having a control device, a steering motor acting on the steered wheels being present, so that the advantages of an exemplary method according to the present invention may also have an effect in this steering system.

BRIEF DESCRIPTION OF THE DRAWINGS

FIG. 7a shows an angle compensation on a steering column by a torque regulation system.

FIG. 7b shows an angle compensation on a steering column by a torque control system.

DETAILED DESCRIPTION

Figure 1:
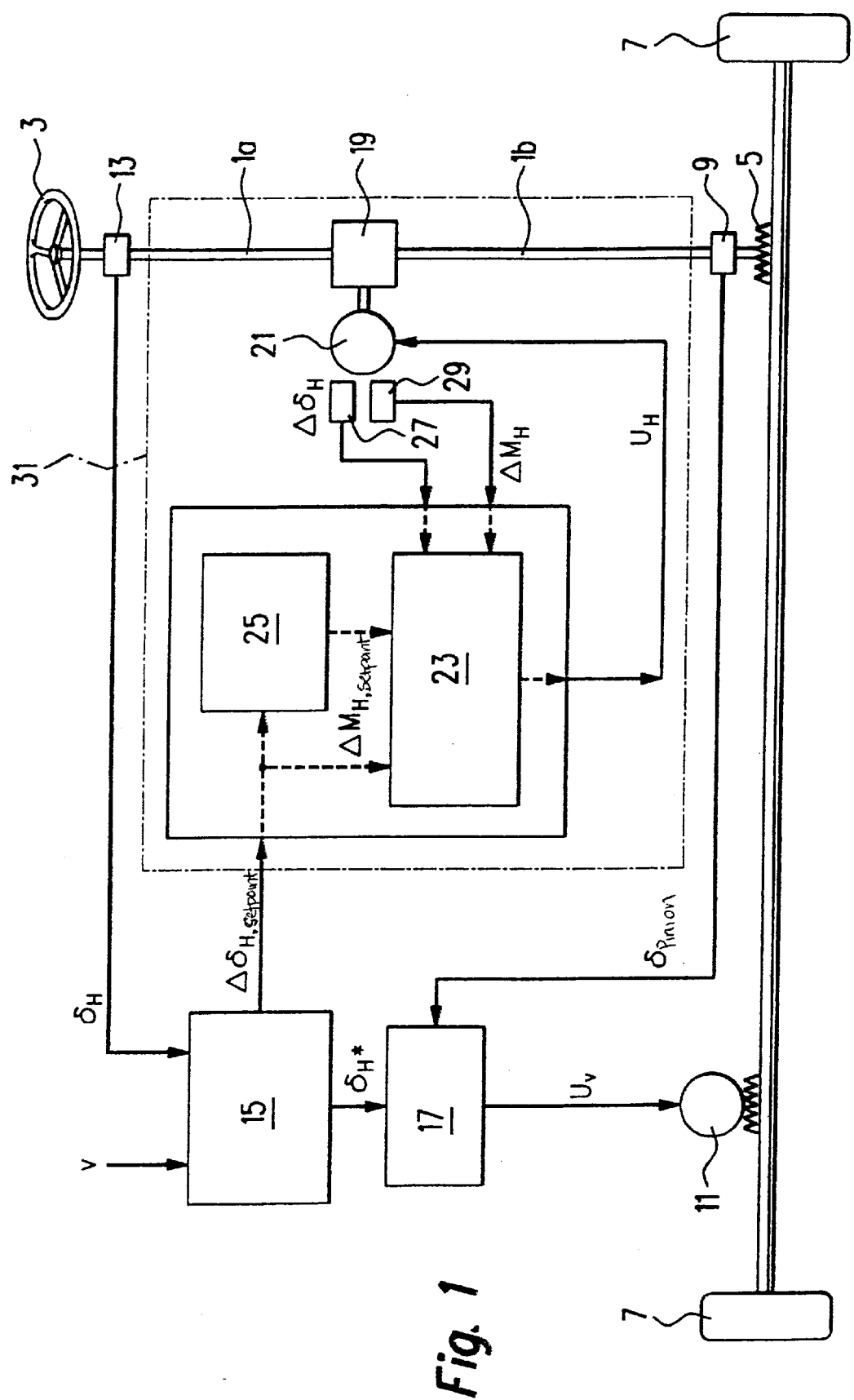
FIG. 1 shows a schematic illustration of a power-assisted steering system having two steering actuators.

FIG. 1 shows a power assisted steering system of a vehicle having two actuators. A steering wheel 3 attached to a steering column 1 is connected to steered wheels 7 of the vehicle by a steering gearbox 5. In connection with an exemplary embodiment according to the present invention, the concept "steering wheel" is understood to mean any type of steering handle. Steering gearbox 5 includes a gear rack and a pinion (not shown), connected to steering column 1 so that they rotate together. A first rotational angle sensor 9 is mounted on steering column 1, with which rotational angle $\delta_{Pinion}$ of the pinion of steering gearbox 5 and thus the position of steered wheels 7 may be measured.

An electric steering motor 11 is used for torque support during steering of the vehicle. To regulate steering motor 11, a second rotational angle sensor 13 is provided in the upper part of steering column 1, with which the driver steering wish indicated by rotating steering wheel 3 is detected in the form of a steering wheel angle $\delta_H$. Steering wheel angle $\delta_H$ is modified in a setpoint value generator 15, for example, as a function of a speed v of the vehicle. This modified steering wheel angle $\delta_{H+}$ is the reference variable of a steering regulator 17, into which rotational angle $\delta_{Pinion}$ measured by first rotational angle sensor 9 is also input. Steering motor 11 is driven by steering regulator 17 by a control voltage $U_v$, and thus supports the steering movement of the vehicle.

A superposition gearbox 19 is mounted on steering column 1. Superposition gearbox 19 may be a planetary gearing, which divides steering column 1 into two sections 1a and 1b. Steering wheel angle $\delta_H$ measured by the second rotational angle sensor 13 may have a further rotational angle superimposed on it using superposition gearbox 19, so that rotational angle $\delta_{Pinion}$ measured by first rotational angle sensor 9 is not always equal to steering wheel rotational angle $\delta_H$.

Superposition gearbox 19 is driven by a steering wheel motor 21, which has a self-locking mechanical gearbox (not shown), and is coupled with superposition gearbox 19 by this gearbox.

Steering wheel motor 21 is regulated by a steering wheel regulator 23, whose reference variable is either correction steering wheel angle $\Delta\delta_{H,setpoint}$ output by setpoint value generator 15 or correction torque $\Delta M_{H,setpoint}$ calculated by a first converter 25 from correction steering wheel angle $\Delta\delta_{H,setpoint}$. Either an actual rotational angle $\Delta\delta_H$ measured by a third rotational angle sensor 27 or differential torque $\Delta M_H$ measured by a first torque sensor 29 is fed back into steering wheel regulator 23.

With reference to FIG. 1, the difference between the torque support by steering motor 11, which may also include active steering intervention by changing the position of steered wheels 7 in deviation from the driver's steering wish, and the steering feel compensation system necessary for this purpose, which is visually combined in FIG. 1 by a frame 31, is recognizable.

Figure 2:
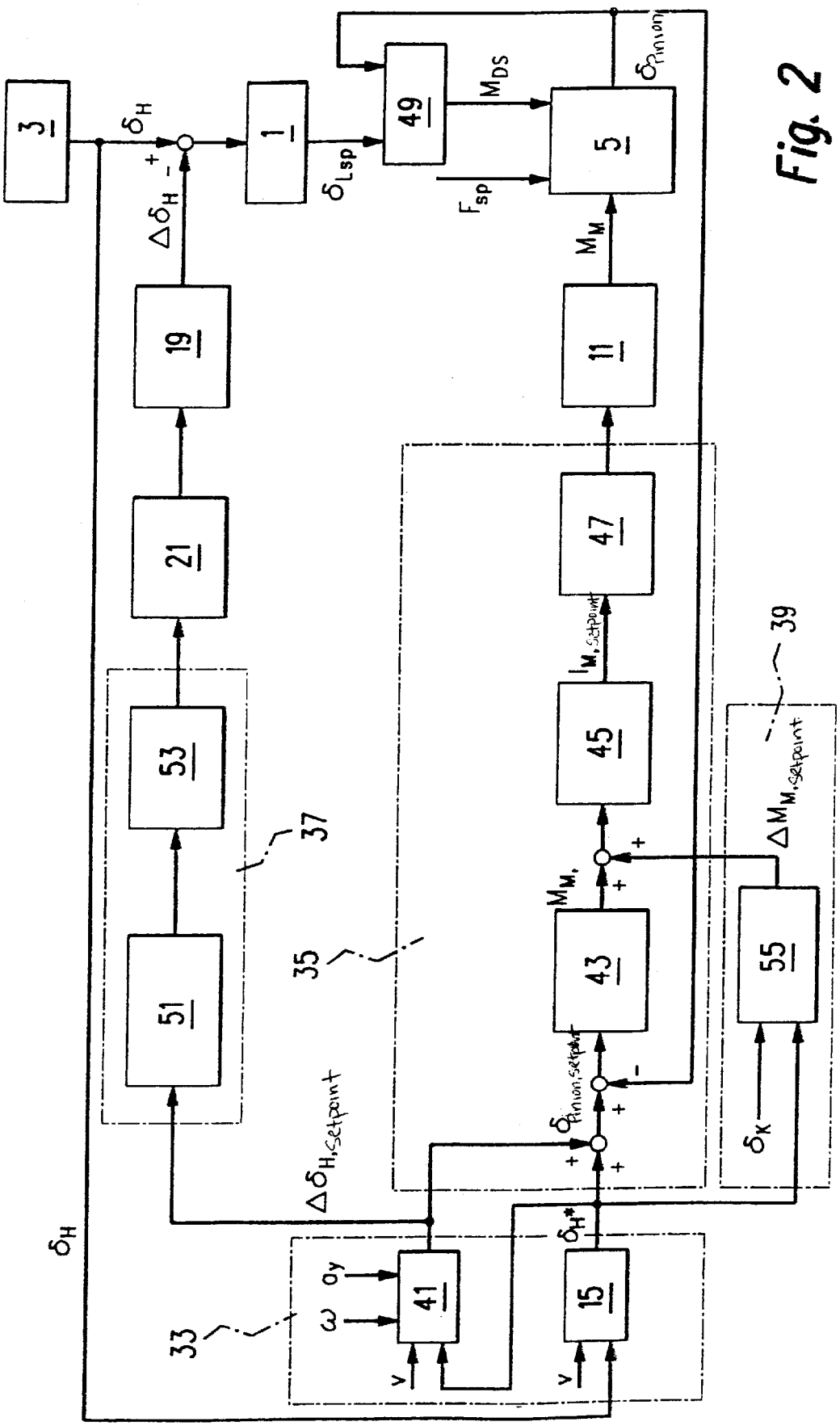
FIG. 2 is a block diagram of the steps of an exemplary method according to the present invention.

FIG. 2 shows the regulation concept of the steering system according to an exemplary embodiment of the present invention in detail. Identical components or blocks have the same reference numbers. Statements made in regard to one figure apply for the other figures as appropriate. The block diagram of FIG. 2 is combined into multiple blocks 33, 35, 37, and 39, which are described in detail below.

Setpoint value generator 15 and a driving dynamics regulator 41 are combined in block 33. The output signal of setpoint value generator 15 is modified steering wheel angle $\Delta_{H+}$, which is used as the reference variable of driving dynamics regulator 41. Driving dynamics regulator 41 also requires speed v and yaw rate ω or transverse acceleration $a_y$ of the vehicle. From this, driving dynamics regulator 41 calculates a correction steering wheel angle $\Delta\delta_{H,setpoint}$. Correction steering wheel angle $\Delta\delta_{H,setpoint}$ and modified steering wheel angle $\delta_{H+}$ are added in an adder and form reference variable $\delta_{pinion,\ setpoint}$ of first position regulator 43.

The regulation of the position of steered wheels 7 is performed in block 35, which also includes position regulator 43. First position regulator 43 drives steering motor 11 so that pinion angle $\Delta_{Pinion}$, which is measured by first rotational angle sensor 5, follows reference variable $\delta_{Pinion,\ setpoint}$. Setpoint steering torque $M_{M,setpoint}$ necessary for this purpose, which is to be applied by steering motor 11, is the output variable of first position regulator 43. Setpoint steering torque $M_{M,setpoint}$ is converted into a setpoint current $I_{H,setpoint}$ by a second converter 45. The torque/current conversion necessary for the torque support also depends on the construction of steering motor 11. In the case of a direct current motor, the relationship between current and torque is linear. In a synchronous motors, the conversion is nonlinear and dependent on the operating point; thus, field-oriented regulation may be used in second converter 45.

A first current regulator 47 converts setpoint current $I_{H,setpoint}$ into a corresponding voltage, with which steering motor 11 is activated. Steering motor 11 thus generates a motor torque $M_M$, which is added to the steering torque applied by steering gearbox 5. In FIG. 2, steering gearbox 5 is implemented as a rack and pinion steering system. A rotating bar 49 ensures a hand torque $M_{DS}$ of steering gearbox 5. Tie rod force $F_{Sp}$ also acts on steering gearbox 5.

To ensure that the driver does not feel an intervention of driving dynamics regulator 41 at steering wheel 3, a compensation regulator 51 is provided, whose reference variable is correction steering wheel angle $\Delta\delta_{H,setpoint}$. Steering wheel motor 21 is activated by a second current regulator 53. This motor drives superposition gearbox 19, so that the intervention in the position of steered wheels 7 caused by correction steering wheel angle $\Delta\delta_{H,setpoint}$ is not noticeable at steering wheel 3.

A lane guidance regulation system 39 having a lane guidance regulator 55 is illustrated as an exemplary steering system according to the present invention. In the case of an automatic lane guidance system of the vehicle, a preset course $\delta_K$, which may, for example, be determined with the aid of a video camera directed toward the roadway, is compared with modified steering wheel angle $\delta_{H+}$ and a setpoint torque difference $\Delta M_{M,setpoint}$ which is added to setpoint steering torque $M_{M,setpoint}$, is generated using lane guidance regulator 55. Since setpoint torque difference $\Delta M_{M,setpoint}$ is not considered in compensation regulation system 37, the driver feels setpoint torque differential $\Delta M_{M,setpoint}$ of the lane guidance regulation system at steering wheel 3, so that he may decide whether he will follow lane guidance regulation system 39 or will follow his original steering wish. In this manner, the driver receives steering aid in the form of a lane guidance system and still maintains the responsibility for the steering decision.

Further functions may be integrated into an exemplary steering system according to the present invention in the same way as driving dynamics regulation system 41 and lane guidance regulation system 39. In this case, the effects of this function on the steering wheel may be compensated for, for example, in the same way as described above with respect to the driving dynamics regulation system, or may not be compensated for, for example, in the same way as described above with respect to the lane guidance regulation system 39.

Figure 3:
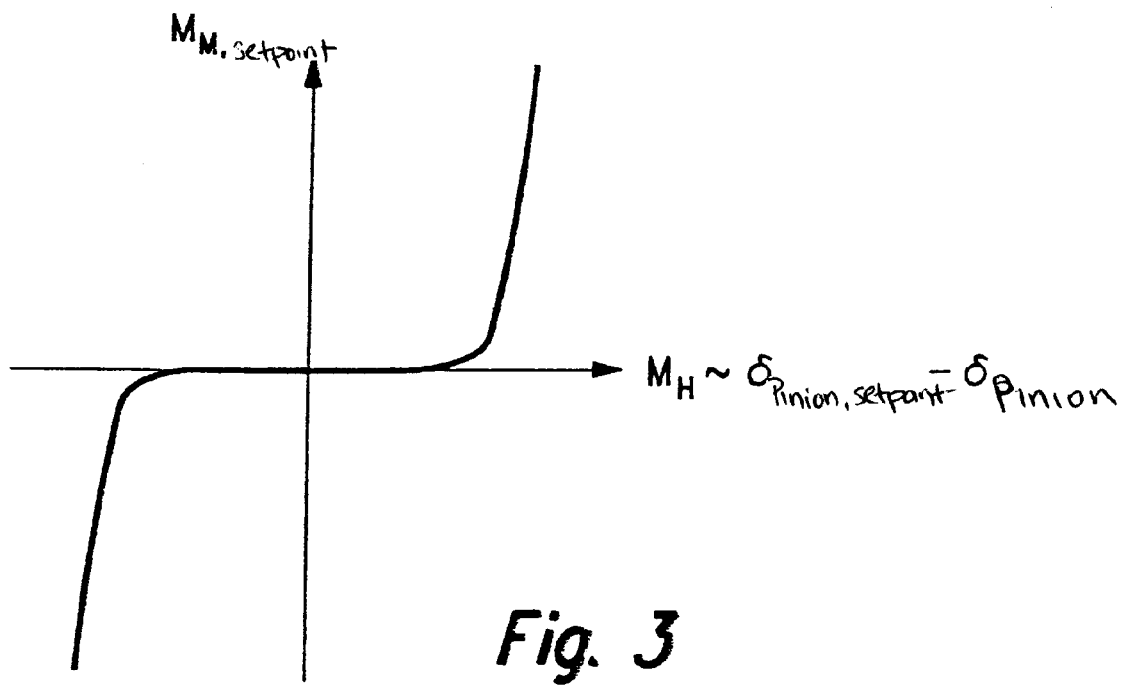
FIG. 3 shows an exemplary nonlinear adaptive characteristic.

FIG. 3 shows a possible characteristic of a first position regulator 43. The design of the position regulator depends strongly on steering motor 11 and is not described here in more detail. In principle, regulators having digital algorithms based on a PD structure, a cascade structure, or a generally adaptive structure may be suitable. The basic idea in this case is the generation of setpoint torque support $M_{M,setpoint}$ with the aid of a position regulation system. To achieve specific desired support behaviors, nonlinear static characteristics or adaptive variable regulator amplifications may be necessary in addition to the linear regulator types described above. In FIG. 3, a nonlinear static characteristic of a first position regulator 43 is illustrated.

Figure 4:
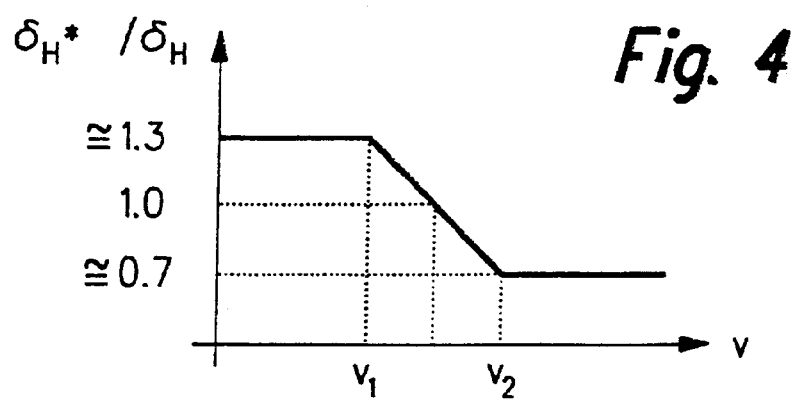
FIG. 4 shows an exemplary speed-dependent transmission of the steering.

A possible implementation of modified steering wheel angle $\delta_{H+}$ is described below with reference to FIG. 4. Steering gearbox 5 of the rack and pinion steering system is designed using a fixed steering angle reduction ratio of 17:1 to 15:1. This support is perceived as pleasant by the driver at average driving speeds v. During maneuvering, large wheel steering angles may be achieved using small steering wheel angles, i.e., the steering angle reduction ratio may be reduced to, for example, 8:1 at lower speed. At a higher speed, the steering angle reduction ratio may be increased to, for example, 20:1. This speed-dependent steering reduction ratio is fulfilled by the arrangement illustrated in FIG. 4. In FIG. 4, a nonlinear relationship between modified steering wheel angle $\delta_{H+}$ and steering wheel angle $\delta_H$ as a function of driving speed v is illustrated. At speeds less than $v_1$, the ratio $\delta_{H+}:\delta_H=1.3$; at speeds greater than $v_2$, this ratio =0.7. In the speed range between $v_1$ and $v_2$, the ratio of $\delta_{H+}$ to $\delta_H$ changes linearly.

Since $\delta_{H+}$ is part of the reference variable of first position regulator 43, steering motor 11 is activated until angle $\delta_{Pinion}$ corresponds to reference variable $\delta_{Pinion,setpoint}$. Due to the nonlinear characteristic of setpoint value generator 15 illustrated in FIG. 4, the relationship between $\delta_{Pinion}$ and $\delta_H$ is also nonlinear. $\delta_{H+}$ is indirectly input as $\Delta\delta_{H,setpoint}$ into the compensation regulation system by driving dynamics regulator 41, so that the driver does not perceive the changing steering reduction ratio at steering wheel 3.

Figure 5:
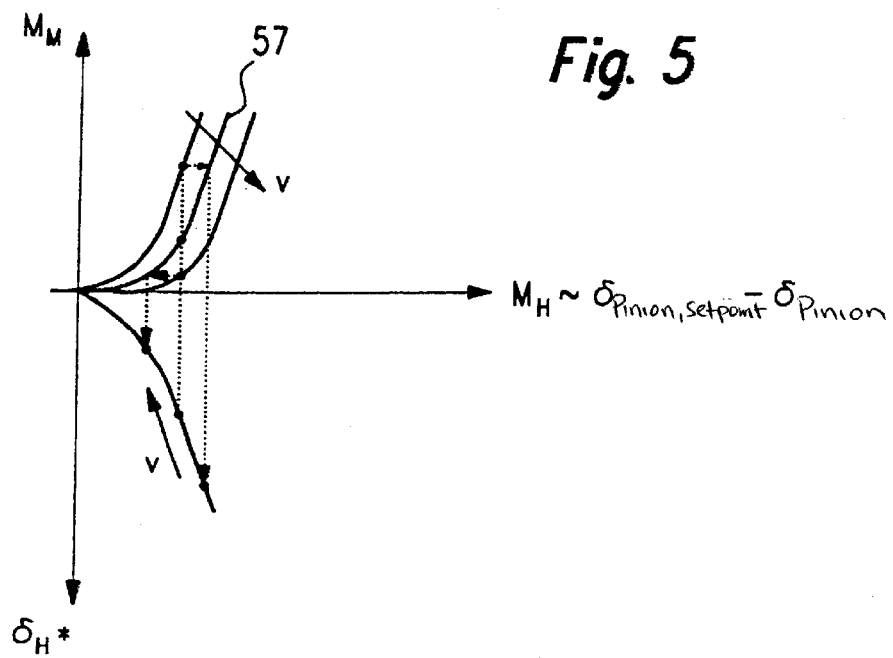
FIG. 5 shows an exemplary speed-dependent torque support according to the present invention.

A speed-dependent torque support is also simultaneously implemented by the speed-dependent steering transmission ratio. In FIG. 5, the implementation of the speed-dependent torque support through the combination of the speed-dependent steering transmission ratio and a $M_H/M_M$ characteristic is illustrated. In the upper part of FIG. 5, a speed-dependent torque support by a set of $M_H/M_M$ characteristics is illustrated. The speed-dependent torque support may also, however, be achieved by a characteristic 57 with the aid of the speed-dependent steering transmission ratio illustrated in the lower part of FIG. 5. This speed-dependent torque support is simpler and more cost-effective to implement. Due to the speed-dependent steering transmission ratio, the torque support also changes according to the speed, i.e., at lower speeds the steering is more direct and the torque support is greater than at higher speeds.

Figure 6:
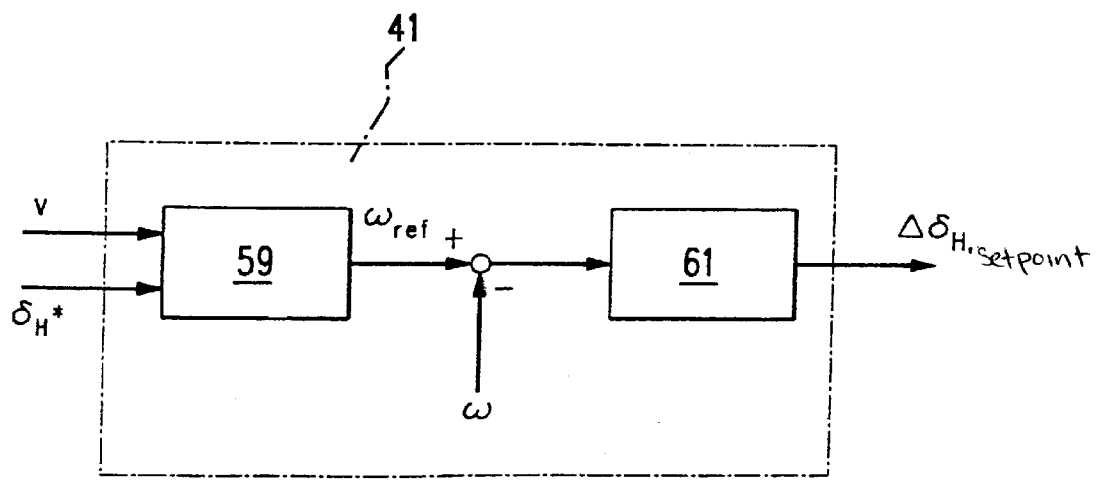
FIG. 6 is a block diagram of a driving dynamics regulation system.

FIG. 6 shows steering dynamics regulator 41 in detail. Steering dynamics regulator 41 includes a reference model 59, which, starting from modified steering wheel angle $\delta_{H+}$ and speed v of the vehicle, calculates a reference yaw rate $\omega_{ref}$. In this case, the speed-dependent steering transmission ratio and the kinematics of the steering system are considered. The difference between reference yaw rate $\omega_{ref}$ and yaw rate $\omega$ of the vehicle measured by a yaw sensor (not shown) is the reference variable of a yaw regulator 61. From this, yaw regulator 61 determines a correction steering wheel angle $\Delta\delta_{H,setpoint}$ which, as shown in FIG. 2, is input into both the reference variable of first position regulator 43 and compensation regulation system 37.

Speed-dependent modified steering wheel angle $\delta_{H+}$ is adjusted with the aid of yaw regulator 61 so that the desired yaw behavior of the vehicle is maintained. The reference model 59 is used to preset the desired yaw behavior in a setpoint yaw rate $\omega_{ref}$. The yaw regulator may be a standard PID regulator or a more robust model-following regulator.

Alternatively to yaw rate $\omega$, transverse acceleration ay may also be used for the driving dynamics regulation system.

The desired value calculation according to an exemplary embodiment of the present invention for the position-regulated torque support may be advantageous because the requirements for "variable, speed-dependent torque support" and "driving dynamics regulation system" may be fulfilled with one another. This results from, among other things, the result shown in FIG. 5. Normally, driving dynamics interventions occur at a higher speed v. The torque support is normally slight in this case. However, by superimposing driving dynamics correction angle $\Delta_{H,setpoint}$, the torque support may be increased even at higher driving speeds using driving dynamics intervention. This avoids the position regulation system and the driving dynamics regulation system working against one another.

Through the superposition of correction steering wheel angle $\Delta_{H,setpoint}$ onto the reference variable of first position regulator 43, a change in the steering feel simultaneously arises, which is transmitted as a steering angle difference by steering column 1 to steering wheel 3 and thus to the driver. If the change in the steering feel is to be avoided, the steering angle difference may be compensated for as described above.

FIG. 7a shows a block diagram of an exemplary compensation of correction steering wheel angle $\Delta\delta_{H,setpoint}$ on steering wheel 3. Input quantity $\Delta\delta_{H,setpoint}$ of compensation regulation 37 is converted into a correction torque $\Delta M_{setpoint}$ by emulating the regulation circuit of position regulation 35 and of steering motor 11 and steering gearbox 5. This conversion is performed by a second position regulator 63 corresponding to first position regulator 43 and a steering model 65. Setpoint correction steering wheel torque $\Delta M_{H,setpoint}$ forms, together with differential torque $\Delta M_H$ mea-sured at superposition gearbox 19, the input dimension of compensation regulator 51. Steering wheel motor 21 is driven by second current regulator 53, so that superposition gearbox 19 superimposes a correction steering angle $\Delta\delta_H$ onto upper section 1a of steering column 1 and the driver feels nothing of the intervention of driving dynamics regulator 41 at steering wheel 3.

This exemplary embodiment calculates, from correction steering wheel angle $\Delta\delta_{H,setpoint}$, the steering feel change caused by the driving dynamics intervention, which results from setpoint correction steering wheel torque $\Delta M_{H,setpoint}$ and subsequently compensates for it.

FIG. 7b shows a second exemplary angle compensation according to the present invention. Instead of a torque regulation system, a torque control system is used, so that a torque sensor in superposition gearbox 19 may be dispensed with. Instead of compensation regulator 51, a third converter 71 is used which converts Setpoint correction steering wheel torque $\Delta M_{H,setpoint}$ into a setpoint correction current $\Delta I_{H,setpoint}$.

Figure 8:
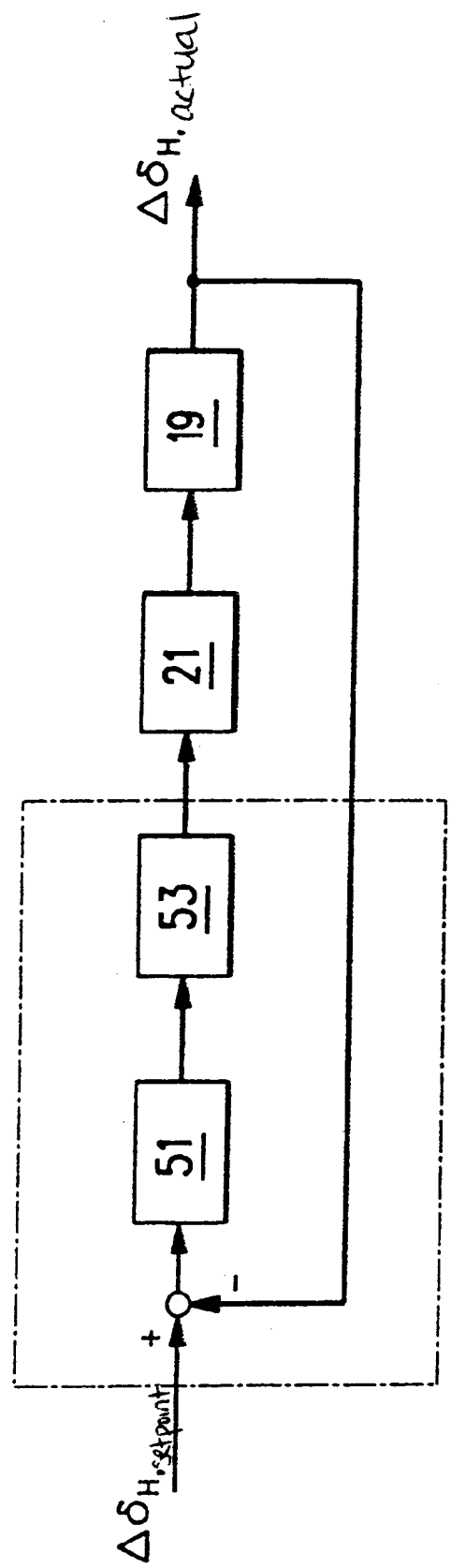
FIG. 8 shows an angular compensation on a steering column by a position regulation system.

FIG. 8 shows a third exemplary angle compensation according to the present invention. In this exemplary embodiment, compensation regulator 51 is implemented as a position regulator. Correction steering wheel angle $\Delta\delta_H$, setpoint is compared with a rotational angle difference $\delta_H$ measured at superposition gearbox 19 and steering wheel motor 21 is activated by second current converter 53, so that the change in the steering feel at steering wheel 3 is removed.

The compensation of the change in the steering feel is described above with reference to an intervention in the position of the steered wheels by driving dynamics regulator 41. Other influences which are disturbing for the driver may also be eliminated by the compensation regulation and control systems described in FIGS. 7 and 8.

Figure 9:
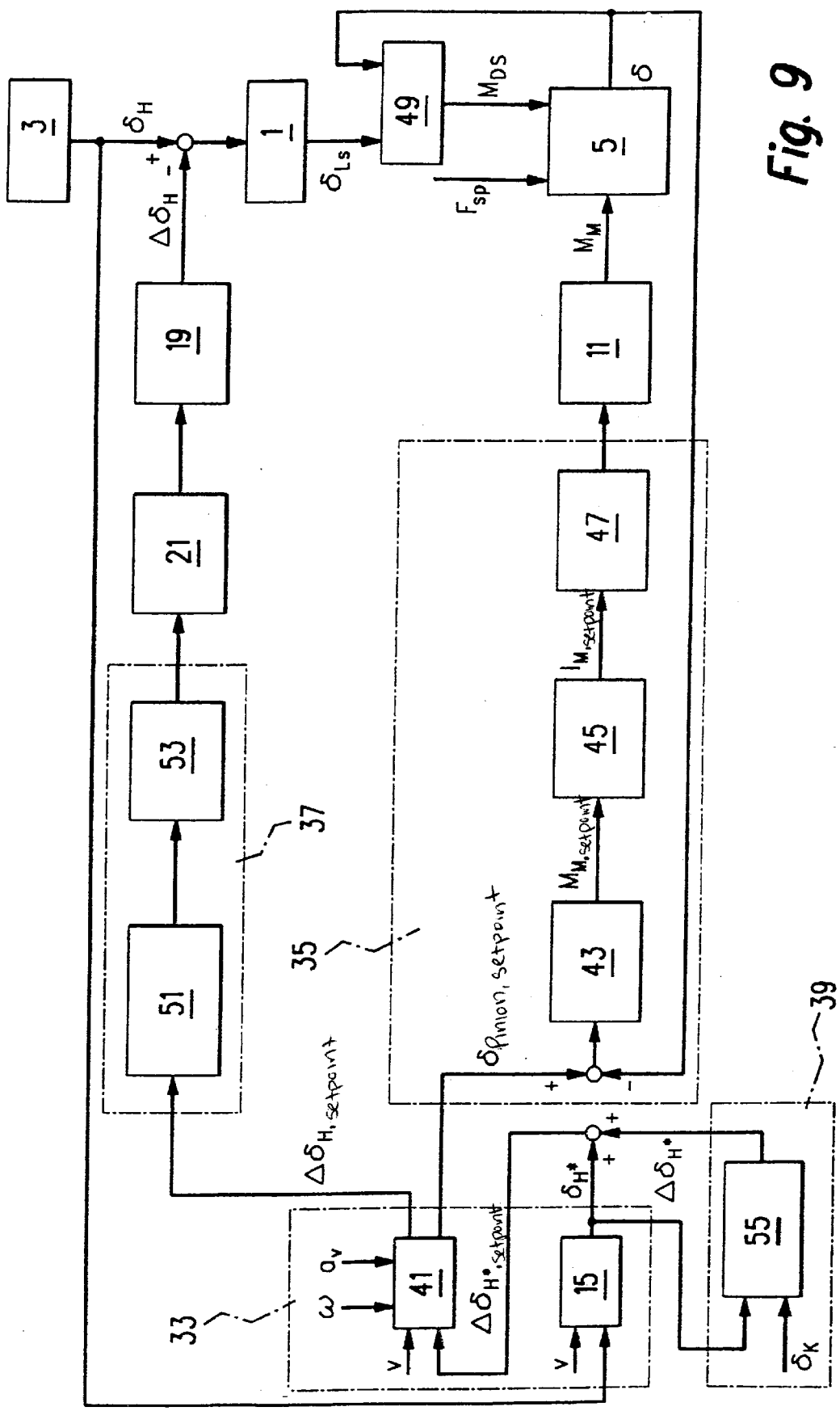
FIG. 9 shows a second exemplary lane guidance system according to the present invention.

FIG. 9 shows a second exemplary integration of a lane guidance regulation system into the steering system according to the present invention. In contrast to the exemplary embodiment shown in FIG. 2, the output signal of lane guidance regulator 55 is not added to setpoint steering torque $M_{M, setpoint}$, but rather a lane-guidance steering wheel angle difference $\Delta_{H+}$ with respect to modified steering wheel angle $\delta_{H+}$ is added to setpoint steering wheel angel $\delta_{H+,setpoint}$ and introduced into driving dynamics regulator 41. Driving dynamics regulator 41 provides the output quantities of correction steering wheel angle $\Delta\delta_{H,setpoint}$ and a setpoint pinion angle $\delta_{Pinion, setpoint}$, which, together with measured pinion angle $\delta_{Pinion}$, represent the input dimensions of position regulator 43.

The steering system according to the present invention and the method for steering a vehicle according to the present invention may also be used in steering systems having electrohydrauic torque support, to steer-by-wire steering system, and to steering system without a superposition gearbox 19.

What is claimed is:
1. A method of steering a vehicle, the method comprising:
  detecting a steering wheel angle;
  modifying the steering wheel angle as a function of a driving speed to provide a modified steering wheel angle;
  determining a correction steering wheel angle as a function of driving dynamics of the vehicle;
  superimposing the modified steering wheel angle and the correction steering wheel angle to form a setpoint steering angle;

detecting a position of steered wheels;

forming an angle difference between the setpoint steering angle and the position of the steered wheels;

regulating the position of the steered wheels as a function of the angle difference; and compensating for the correction steering wheel angle at a steering column.

2. The method of claim 1, wherein regulating the position of the steered wheels includes regulating by one of a first position regulator having one of a PD characteristic and a cascade structure and by an adaptive first position regulator, an output signal of the first position regulator being a setpoint torque to be transmitted to a pinion of a steering gearbox, the setpoint torque being converted into a setpoint current, a steering motor being activated using the setpoint current.

3. The method of claim 2, wherein the first position regulator includes one of a nonlinear static characteristic and an adaptive adjustable characteristic.

4. The method of claim 1, further comprising:

converting the modified steering wheel angle into one of a setpoint yaw rate and a setpoint transverse acceleration, the correction steering wheel angle being regulated as a function of one of the setpoint yaw rate and the setpoint transverse acceleration.

5. The method of claim 4, wherein regulation is provided by a yaw regulator that includes one of a PID regulator and a model-following regulator.

6. The method of claim 4, further comprising:

converting the correction steering wheel angle into a correction torque; and converting the correction torque into a setpoint correction current;

wherein the correction steering wheel angle is compensated for at a steering wheel as a function of the setpoint correction current.

7. The method of claim 4, further comprising:

measuring a rotational angle difference between a first part of the steering column and a second part of the steering column; and forming an angle difference between the correction steering wheel angle and the rotational angle difference;

wherein the correction steering wheel angle is compensated for at a steering wheel as a function of the angle difference between the correction steering wheel angle and the rotational angle difference.

8. The method of claim 1, further comprising:

converting the correction steering wheel angle into a correction torque;

measuring a differential torque existing between a first part of the steering column and a second part of the steering column; and forming a torque difference between the correction torque and the differential torque; wherein the correction steering wheel angle is compensated for as a function of the torque difference.

9. The method of claim 1, further comprising:

determining a lane guidance steering wheel angle change; and superimposing a setpoint torque difference on a setpoint steering torque as a function of the lane guidance steering wheel angle change and the modified steering wheel angle.

10. The method of claim 1, further comprising:

determining a lane guidance steering wheel angle change;

forming an angle difference from the modified steering wheel angle and the lane guidance steering wheel angle change;

superimposing a lane guidance steering wheel angle difference on the modified steering wheel angle as a function of the angle difference from the modified steering wheel angle and the lane guidance steering wheel angle change; and regulating the setpoint steering angle as a function of a setpoint steering wheel angle resulting therefrom.

11. A computer program comprising:

program code operable to perform the following:
detecting a steering wheel angle;
modifying the steering wheel angle as a function of a driving speed to form a modified steering wheel angle;
determining a correction steering wheel angle as a function of driving dynamics of the vehicle;
superimposing the modified steering wheel angle and the correction steering wheel angle to form a setpoint steering angle;
detecting a position of steered wheels;
forming an angle difference between the setpoint steering angle and the position of the steered wheels;
regulating the position of the steered wheels as a function of the angle difference; and compensating for the correction steering wheel angle at a steering column.

12. The computer program of claim 11, wherein the program code is stored on a storage medium.

13. A control device for controlling a steering system of a vehicle, the control device comprising:

an arrangement operable to perform the following:
detecting a steering wheel angle;
modifying the steering wheel angle as a function of a driving speed to form a modified steering wheel angle;
determining a correction steering wheel angle as a function of driving dynamics of the vehicle;
superimposing the modified steering wheel angle and the correction steering wheel angle to form a setpoint steering angle;
detecting a position of steered wheels;
forming an angle difference between the setpoint steering angle and the position of the steered wheels;
regulating the position of the steered wheels as a function of the angle difference; and
compensating for the correction steering wheel angle at a steering column.

14. A steering system for a vehicle, the steering system comprising:

a steering wheel positioned on a steering column;

a steering gearbox;

one of a third rotational angle sensor and a first torque sensor mounted on the steering column;

a steering wheel motor for acting on the steering wheel column via a superposition gearbox;

a steering motor for acting on steered wheels;

one of a hydraulic and an electrical steering actuator;

a second rotational angle sensor for measuring a position of the steered wheels; and a control arrangement operable to perform the following:

detecting a steering wheel angle;
modifying the steering wheel angle as a function of a driving speed to form a modified steering wheel angle;
determining a correction steering wheel angle as a function of driving dynamics of the vehicle;
superimposing the modified steering wheel angle and the correction steering wheel angle to form a setpoint steering angle;
detecting a position of steered wheels;
forming an angle difference between the setpoint steering angle and the position of the steered wheels;
regulating the position of the steered wheels as a function of the angle difference; and
compensating for the correction steering wheel angle at a steering column.

* * * * *

UNITED STATES PATENT AND TRADEMARK OFFICE
CERTIFICATE OF CORRECTION

PATENT NO.    : 6,640,923 B1
DATED         : November 4, 2003
INVENTOR(S)   : Dominke et al.

It is certified that error appears in the above-identified patent and that said Letters Patent is hereby corrected as shown below:

Column 7,
Line 32, change "ay" to -- $a_y$ --.

Column 8,
Lines 24 and 25, change "$\Delta \delta_H$'setpoint" to -- $\Delta \delta_{H, \text{set point}}$ --
Line 44, change "angel" to -- angle --

Signed and Sealed this

Twenty-seventh Day of July, 2004

JON W. DUDAS
*Acting Director of the United States Patent and Trademark Office*